March 24, 1970 HIROSHI IKEUCHI 3,502,939

DISTORTION CORRECTING DEVICES FOR MAGNETIC DEFLECTING DEVICES

Filed Feb. 4, 1969

HIROSHI IKEUCHI INVENTOR

BY CHITTICK, PFUND, BIRCH, SAMUELS & GAUTHIER

ATTORNEY

United States Patent Office 3,502,939
Patented Mar. 24, 1970

3,502,939
DISTORTION CORRECTING DEVICES FOR MAGNETIC DEFLECTING DEVICES

Hiroshi Ikeuchi, Tokyo, Japan, assignor to Denki Onkyo Co., Ltd., Tokyo, Japan, a corporation of Japan Continuation-in-part of application Ser. No. 796,010, Feb. 3, 1969. This application Feb. 4, 1969, Ser. No. 796,420
Claims priority, application Japan, Feb. 29, 1968, 43/13,099
Int. Cl. H01j *29/56, 29/72*
U.S. Cl. 315—24 3 Claims

ABSTRACT OF THE DISCLOSURE

A distortion correcting device for a magnetic deflection device comprises a magnetic core in the form of a cubic Wheatstone bridge configuration, a pair of coils respectively wound upon diagonal magnetic members of the bridge, and means to connect said coils to an orthogonal magnetic field generating circuit, at least one of the coils being a deflection current generating coil.

CROSS-REFERENCE TO RELATED APPLICATION

This application is a continuation-in-part of my copending application, Ser. No. 796,010, filed Feb. 3, 1969, entitled Distortion Correcting Devices For Magnetic Deflecting Devices.

BACKGROUND OF THE INVENTION

This invention relates to a cathode ray tube apparatus wherein an electron beam is subjected to magnetic deflection fields in vertical and horizontal directions to cause it to scan across the fluorescent screen of the cathode ray tube and more particularly to a distortion correcting device adapted to correct the so-called bobbin shaped distortion of the raster whereby to describe an equilateral rectangular raster on the fluorescent screen.

For example, in a television receiver, an electron beam emanated from an electron gun of an image receiving tube is subjected to electromagnetic deflecting fields in vertical and horizontal directions produced by a suitable electromagnetic deflector means to describe generally rectangular raster on the fluorescent screen of the image receiving tube. Although it is necessary to describe an equilateral rectangular raster on the fluorescent screen, as is well known in the art, when deflecting the electron beam by means of an electromagnetic device over a wide angle along the fluorescent screen it is necessary to make uniform as far as possible the magnetic field distribution with respect to the electron beam in order to prevent distortion of the beam spot or variation of the beam focus. This problem is more serious in an image receiving tube for color televisions where it is necessary to concentrate three electron beams for three colors. However when such a uniform magnetic field distribution is used to deflect and scan the electron beam the raster becomes to assume a bobbin shape instead of an equilateral rectangle.

In order to describe an equilateral rectangle with a uniform magnetic field distribution by correcting the bobbin shaped distortion it has been proposed to supply to the electromagnetic deflecting device a vertical deflection current $I_V$ and a horizontal deflection current $I_H$ represented by FIGS. 1A and 1B, respectively. More particularly, to produce the vertical deflection current $I_V$, a saw tooth vertical deflection current is modulated by a horizontal component having a horizontal deflection period of $T_H$ so that the vertical deflection current corresponds to a superposition of a horizontal scanning frequency signal $S_H$ with an amplitude gradually decreasing toward to center O of the picture and a saw tooth vertical deflection current as shown in FIG. 1A and to produce the horizontal deflection current $I_H$, the horizontal deflection current is modurated during the vertical deflection period $T_V$ so as to produce a wave having a amplitude gradually increasing toward the center O of the picture as shown in FIG. 1B.

In the past, although various devices and methods have been proposed to obtain such vertical and horizontal deflection currents $I_V$ and $I_H$ all of them are complicated and expensive.

SUMMARY OF THE INVENTION

It is therefore an object of this invention to provide a simple and effective distortion correcting device for magnetic deflection devices.

In accordance with this invention there is provided a distortion correcting device for a magnetic deflection device comprising a magnetic core in the form of a cubic Wheatstone bridge configuration, a pair of coils respectively wound upon diagonal magnetic members of said bridge, means to connect said coils to an orthogonal magnetic field generating circuit, at least one of said coils being a deflection current generating coil. The deflection current generating coil comprises an output winding of a flyback transformer. A high voltage boosting coil may be wound on the same diagonal magnetic member as the horizontal deflection output coil.

BRIEF DESCRIPTION OF THE DRAWING

The invention can be more fully understood from the following detailed description taken in conjunction with the accompanying drawing in which:

FIGS. 1A and 1B show current waveforms necessary for correcting bobbin shaped distortion in which FIG. 1A shows a waveform of the vertical deflection current while FIG. 1B shows a waveform of the horizontal deflection current;

DESCRIPTION OF PREFERRED EMBODIMENTS

Figure 2:
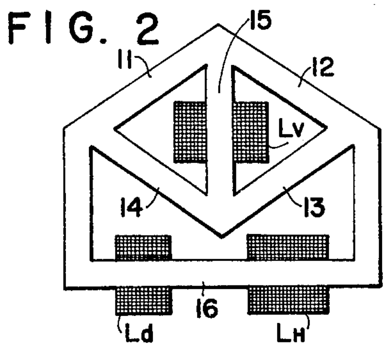
FIG. 2 is a diagram to illustrate the basic construction of a deflection distortion correcting device embodying the principle of this invention.

FIG. 2 illustrates the basic construction of the magnetic core of this invention. The magnetic core shown therein includes four arms 11, 12, 13 and 14 which are arranged in a bridge configuration, a leg 15 forming a diagonal of the bridge and another leg 16 forming another diagonal. A coil $L_V$ carrying the vertical deflection current component, for example, is wound upon the leg 15 while a coil $L_H$ carrying the horizontal deflection current component, for example, is wound upon the leg 16. On either one or both of legs 15 and 16 (in the illustrated example on leg 16) is mounted a coil $L_d$ for producing deflection current. Thus, at least one of legs 15 and 16 is utilized in common with the magnetic core of the deflection current generating device.

Figure 1A:
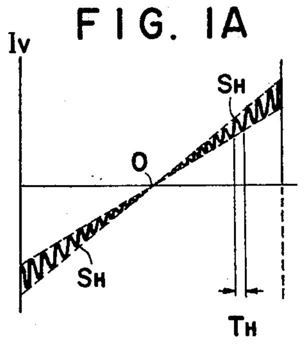
Figure 1B:
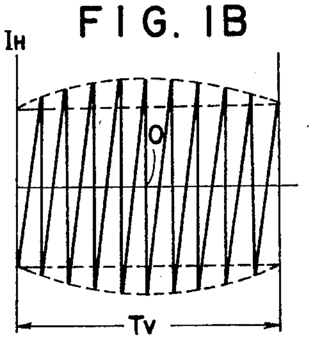

In this manner, four arms 11, 12, 13 and 14 and two diagonal legs 15 and 16 comprise a cubic Wheatstone bridge configuration. The term "a magnetic core in the form of a cubic Wheatstone bridge" is used herein to mean a magnetic core having a rectangular core including four arms and two magnetic diagonal members. For the magnetic material any one of many soft magnetic materials, such as pure iron, is preferred which has a B–H curve wherein the increment of magnetic flux density B gradually decreases toward saturation as the magnetization force H increases. The fact that the vertical deflection current $I_V$ and horizontal deflection current $I_H$ as shown in FIGS. 1A and 1B is obtained by the use of such a magnetic core of the cubic Wheatstone bridge configuration is fully disclosed and described in my copending application Ser. No. 796,010 filed concurrently herewith.

Figure 3:
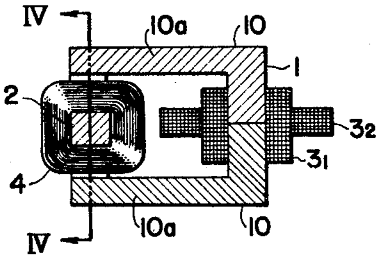
FIG. 3 shows a sectional view of one embodiment of the novel deflection distortion correcting device.
Figure 4:
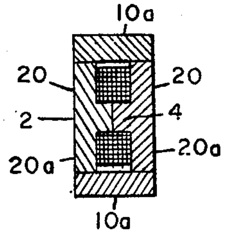
FIG. 4 shows a sectional view taken along a line IV—IV in FIG. 3.

A preferred embodiment of this invention will now be described by referring to FIGS. 3 and 4 wherein reference numeral 1 represents a U-shaped core including two abutted L-shaped core sections 10, and reference numeral 2 represents a H-shaped core including a pair of T-shaped core sections 20 with their vertical legs abutted as shown in FIG. 4.

Around each of the abutting portions of the respective core sections is wound at least one coil block. In the illustrated example, two coil blocks $\mathbf{3}_1$ and $\mathbf{3}_2$ are provided to surround the abutting portion of core sections 10 while a single coil block 4 around the abutting portion of core sections 20.

Thus, to the outer ends of a pair of open legs **10*a* of core sections 10 are abutted the ends of a pair of open legs 20*a*** of each core section to form an integral magnetic core of the cubic Wheatstone bridge configuration as shown in FIG. 4.

Figure 5:
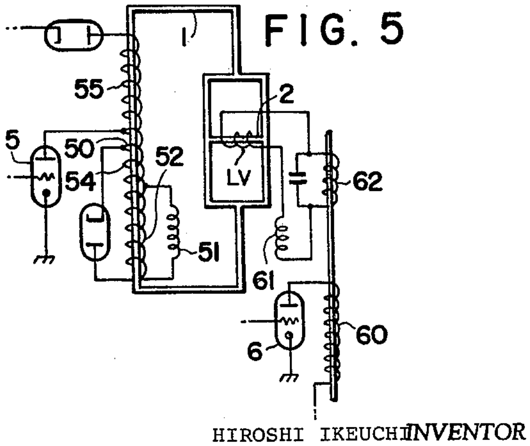
FIG. 5 illustrates a circuit diagram to explain one application of a deflection distortion correcting device embodying this invention.

Coil blocks $\mathbf{3}_1$ and $\mathbf{3}_2$ on the V-shaped core 1 is similar to a coil block wound upon a flyback transformer which has been utilized as the horizontal deflection power output transformer. As shown in FIG. 5 the coil blocks $\mathbf{3}_1$ and $\mathbf{3}_2$ (FIG. 3) comprises at least a driving coil 50 driven by a horizontal deflection output element 5 and an output coil 52 for a deflection coil 51, as shown in FIG. 5. In addition, the coil block may also include a pulse voltage boosting coil 55 or a damper coil 54 or an AGC coil, a blanking coil, a focussing coil, a coil for a high voltage rectifier tube and the like which have been associated with the flyback transformer. Similarly, the coil block 4 (FIG. 3) wound upon H-shaped core 2 may comprise a driving coil 60 driven by a deflection output element 6 and an output coil 62 for a deflection coil 61.

Stated another way, the novel device can be considered such that in a conventional horizontal deflection output flyback transformer or a vertical output transformer, a diagonal of a bridge shaped magnetic core having four arms and another bridging diagonal is connected in series with a portion of the magnetic core carrying the main flux and that a coil connected to orthogonal magnetic field generating device is wound upon said bridging diagonal. This is equivalent to a construction wherein the core carrying the main flux is comprised by said U-shaped core to which said H-shaped core 2 is connected magnetically.

In view of this, the novel device may have various configurations by utilizing the technique that has been developed in connection with the prior art deflection power output transformer. More particularly, although in the construction shown in FIG. 5 the driving coil 50 (corresponding to coil block $\mathbf{3}_1$ in FIG. 3) and pulse voltage boosting coil 55 (coresponding to coil block $\mathbf{3}_2$ in FIG. 3) are shown overlapped, it is obvious that they may be connected in parallel.

In this manner, in accordance with this invention, it is possible to combine into an integral unit a deflection power output device and a deflection distortion correcting device which have been provided independently thus dedecreasing the space occupied by them in the television receiver. Furthermore, the construction of the assembly can be greatly simplified.

Figure 6:
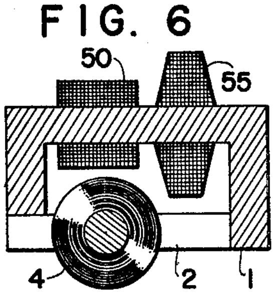
FIG. 6 shows a section of a modified embodiment of this invention.

FIG. 6 illustrates a miniaturized modified embodiment with U- and H-cores generally similar to the embodiment of FIG. 3. In this figure a horizontal deflecting output coil 50 and a high voltage boosting coil 55 having a larger diameter than coil 50 are wound upon a U-shaped core 1, and a coil block 4 connected to a vertical output circuit is mounted on a H-shaped core 2 opposite the horizontal deflection output coil 50. This construction greatly reduces the physical dimentions of the device.

While the invention has been shown and described in connection with certain preferred embodiments thereof it should be understood that many changes and modifications may be made without departing from the true spirit and scope of the invention as defined in the appended claims.

What is claimed is:

1. A distortion correcting device for a magnetic deflection device comprising a magnetic core in the form of a cubic Wheatstone bridge configuration, a pair of coils respectively wound upon diagonal magnetic members of said bridge, and means to connect said coils to an orthogonal magnetic field generating circuit, at least one of said coils being a deflection current generating coil.

2. The distortion correcting device according to claim 1 wherein said deflection current generating coil comprises an output winding of a flyback transformer.

3. The distortion correcting device according to claim 1 wherein a horizontal deflection output coil and a high voltage boosting coil are wound upon one of said diagonal magnetic members, and a coil connected to a vertical deflection output circuit is wound upon the other of said diagonal magnetic members.

References Cited

UNITED STATES PATENTS

| | | | |
|---|---|---|---|
| 2,906,919 | 9/1959 | Thor et al. | 315—24 |
| 3,440,482 | 4/1969 | Lister et al. | 315—24 |

RODNEY D. BENNETT, JR., Primary Examiner

T. H. TUBBESING, Assistant Examiner

PO-1050
(5/69)

UNITED STATES PATENT OFFICE
CERTIFICATE OF CORRECTION

Patent No. 3,502,939 Dated March 24, 1970

Inventor(s) Hiroshi Ikeuchi

It is certified that error appears in the above-identified patent and that said Letters Patent are hereby corrected as shown below:

Column 3, line 31, the word "V-shaped" should be --U-shaped--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,502,939 Dated March 24, 1970

Inventor(s) Hiroshi Ikeuchi

It is certified that error appears in the above-identified patent and that said Letters Patent are hereby corrected as shown below:

Column 3, line 31, the word "V-shaped" should be --U-shaped--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents